US011041619B2

(12) United States Patent
Keller et al.

(10) Patent No.: US 11,041,619 B2
(45) Date of Patent: Jun. 22, 2021

(54) NON-PREMIXED SWIRL BURNER TIP AND COMBUSTION STRATEGY

(71) Applicants: Jay Keller, Oakland, CA (US); Susan Schoenung, Menlo Park, CA (US)

(72) Inventors: Jay Keller, Oakland, CA (US); Susan Schoenung, Menlo Park, CA (US)

( * ) Notice: Subject to any disclaimer, the term of this patent is extended or adjusted under 35 U.S.C. 154(b) by 139 days.

(21) Appl. No.: 16/084,802

(22) PCT Filed: Feb. 28, 2017

(86) PCT No.: PCT/US2017/019836
§ 371 (c)(1),
(2) Date: Sep. 13, 2018

(87) PCT Pub. No.: WO2017/160492
PCT Pub. Date: Sep. 21, 2017

(65) Prior Publication Data
US 2019/0078777 A1 Mar. 14, 2019

Related U.S. Application Data

(60) Provisional application No. 62/308,599, filed on Mar. 15, 2016.

(51) Int. Cl.
*F23D 14/24* (2006.01)
*F23R 3/28* (2006.01)
(Continued)

(52) U.S. Cl.
CPC .............. *F23D 14/24* (2013.01); *F23D 11/36* (2013.01); *F23D 11/383* (2013.01); *F23R 3/28* (2013.01);
(Continued)

(58) Field of Classification Search
CPC .......... F23D 14/22; F23D 14/28; F23D 14/74; F23D 2900/00014; F23D 14/62;
(Continued)

(56) References Cited

U.S. PATENT DOCUMENTS 2,528,984 A * 11/1950 Wilhelm ................. F23D 11/10
431/210
5,628,184 A * 5/1997 Santos ...................... F02C 3/22
60/39.281
(Continued)

FOREIGN PATENT DOCUMENTS

SU 1712740 A1 2/1992

*Primary Examiner* — Jason Lau
(74) *Attorney, Agent, or Firm* — David Guerra

(57) ABSTRACT

The present invention is a combustion strategy using a swirl burner tip, which is one of stoichiometric mixture of reactants ($2H_2+O_2 \rightarrow 2H_2O$) with added high quality dry steam ($H_2O$ (g)) as a thermal diluent. The amount of dry steam can be determined by the safety requirements of the reactants and the desired temperature of post-flame gases. It can be appreciated that the design of the swirl burner tip is for safe handling of the reactants, and for rapid and thorough mixing of the reactants so combustion occurs in a nearly premixed configuration exterior of the swirl burner tip. The $H_2/O_2$ ratio is fixed to consume all $H_2$ and $O_2$ (stoichiometric), with dry steam ($H_2O$ (g)) strategically added to the reactants. The burner tip is configured to create counter swirling reactant flows separate from each other.

10 Claims, 3 Drawing Sheets

(51) Int. Cl.
*F23D 11/36* (2006.01)
*F23D 11/38* (2006.01)
*B01J 19/26* (2006.01)
*C01B 3/36* (2006.01)

(52) U.S. Cl.
CPC ...... *B01J 19/26* (2013.01); *B01J 2219/00123* (2013.01); *B01J 2219/00157* (2013.01); *C01B 3/363* (2013.01)

(58) Field of Classification Search
CPC ........... F23D 2900/14701; F23D 14/24; F23D 11/36; F23D 11/383; F23D 14/82; F23D 1/00; F23R 3/286; F23R 2900/00014; F23R 3/346; F23R 3/34; F23R 2900/03341; F23R 3/002; F23R 3/28; F23R 3/46; F23R 3/06; F23R 3/36; F23R 3/16; F23R 3/14; F23R 3/42; F23R 2900/00013; F23R 3/283; F23R 3/20; F23R 2900/03043; F23R 2900/03044; F23R 3/10; F23R 3/343; F23R 2900/00002; F23R 2900/03042; F23R 3/12; F23R 3/18; F23R 3/60; F23R 2900/03041; F23R 3/005; F23R 3/04; F23R 3/045; F23R 2900/00004; F23R 2900/00015; F23R 2900/00017; F23R 2900/00019; F23R 2900/03045; F23R 3/26; F23R 3/30; F23R 3/32; F23R 3/54; F23R 2900/00012; F23R 2900/03343; F23R 3/007; F23R 3/48; F23R 3/50; F23R 3/52; F23R 3/58; F23N 2223/40; F23N 2223/44; F23N 1/022; F23N 1/082; F23N 2223/08; F23N 2225/21; F23N 2239/02; F23C 2900/01001; F23C 2900/9901; F23C 9/00; F23C 9/006
See application file for complete search history.

(56) References Cited

U.S. PATENT DOCUMENTS

| | | | | |
|---|---|---|---|---|
| 6,652,268 | B1* | 11/2003 | Irwin | F23D 14/24 431/115 |
| 2002/0050097 | A1 | 5/2002 | Fournier | |
| 2003/0157450 | A1* | 8/2003 | Joshi | F23C 7/002 431/161 |
| 2005/0028712 | A1* | 2/2005 | Wang | F23D 1/00 110/261 |
| 2005/0281736 | A1* | 12/2005 | Bedetti | C01B 3/363 423/651 |
| 2009/0120338 | A1* | 5/2009 | Adendorff | C03B 5/235 110/345 |

\* cited by examiner

NON-PREMIXED SWIRL BURNER TIP AND COMBUSTION STRATEGY

TECHNICAL FIELD

The present invention relates to a non-premixed swirl burner tip and combustion strategy for use in connection with non-premixed combustion of dry steam mixed with the $O_2$ and/or $H_2$ to enable safe handling of $O_2$ and to provide an in situ mechanism for controlling the temperature of the post flame gases.

BACKGROUND ART

The present invention relates to a non-premixed swirl burner tip and method for use in connection with creating a combustion strategy for volatile gases. The use of concentric or co-axial combustion nozzles for premixing and igniting gases is known in the prior art. Premixing a stoichiometric mixture, such as but not limited to, hydrogen ($H_2$) and oxygen ($O_2$) before combustion will create an explosive mixture that could detonate upon ignition. The resulting overpressure will breach any reasonable nozzle structure. Should this occur, it will result in containment failure and an extremely dangerous situation, which could result in a violent explosion. Existing burners are either premixed or non-premixed in strategy. Prior art non-premixed configurations do not address the reactive properties of pure oxygen ($O_2$). The combustion strategy of this invention utilizes gaseous water mixed in with the oxygen ($O_2$) and/or the hydrogen ($H_2$) to reduce the reactivity of the $O_2$ and to provide a mechanism to control the temperature in the post flame gases of the $H_2+O_2$ combustion reaction.

While the above-described devices fulfill their respective, particular objectives and requirements, the aforementioned patents do not describe a non-premixed swirl burner tip that allows creating a safe and controlled combustion strategy for hydrogen ($H_2$) and oxygen ($O_2$) gases.

Therefore, a need exists for a new and improved non-premixed swirl burner tip that can be used for creating a combustion strategy for hydrogen-oxygen gases. In this regard, the present invention substantially fulfills this need. In this respect, the non-premixed swirl burner tip according to the present invention substantially departs from the conventional concepts and designs of the prior art, and in doing so provide an apparatus primarily developed for the purpose of creating a safe and controlled combustion strategy for hydrogen-oxygen gases.

DISCLOSURE OF INVENTION

In view of the foregoing disadvantages inherent in the known types of concentric or co-axial combustion nozzles now present in the prior art, the present invention provides an improved non-premixed swirl burner tip, and overcomes the above-mentioned disadvantages and drawbacks of the prior art if applied to hydrogen-oxygen combustion systems. As such, the general purpose of the present invention, which will be described subsequently in greater detail, is to provide a new and improved non-premixed swirl burner tip and method which has all the advantages of the prior art mentioned heretofore and many novel features that result in a non-premixed combustion strategy which is not anticipated, rendered obvious, suggested, or even implied by the prior art, either alone or in any combination thereof.

The present invention is essentially a combustion strategy of $H_2+O_2+H_2O(g)$ introduced in a non-premixed configuration into a mixing zone where controlled safe combustion occurs. Adding dry steam $H_2O(g)$ in with the $O_2$ and possibly the $H_2$ is provided for reactive control over the $O_2$ and also provides a mechanism to control the temperature of the post flame gases. The addition of dry steam may be used as a thermal diluent. The amount of dry steam can be determined by the safety requirements of the reactants and the desired temperature of post-flame gases. The $H_2/O_2$ ratio is fixed to consume all $H_2$ and $O_2$ (stoichiometric), with dry steam ($H_2O$ (g)) strategically added to the reactants.

To attain this, the present invention essentially comprises a burner tip having a first conduit and a second conduit located coaxially within the first conduit. The first conduit having a configuration capable of receive a first fluid, while defining a hollow interior and a first exit port. The first conduit includes at least one first spiral vane extending from an interior surface of the first conduit into the hollow interior. The first spiral vane have a configuration capable of creating a first spiral flow of the first fluid traveling through the first conduit, with the first spiral flow being in a first rotational direction. The second conduit having a configuration capable of receive a second fluid, while defining a hollow interior and a second exit port. The second conduit includes at least one second spiral vane extending from an interior surface of the second conduit into the hollow interior of the second conduit. The second spiral vane having a configuration capable of creating a second spiral flow of the second fluid traveling through the second conduit, with the second spiral flow being in a second rotational direction opposite the first spiral direction.

It can be appreciated that the design of the swirl burner tip is for safe handling of the reactants, and for rapid and thorough mixing of the reactants so combustion occurs in a nearly premixed configuration exterior of the swirl burner tip.

The first spiral vane can extend toward and contacts an exterior surface of the second conduit to provide structural support.

The first spiral vane can have a configuration capable of creating the first spiral flow to exit the first exit port in a first direction substantially parallel with a longitudinal axis of the first exit port, and then in a second direction substantially toward the second exit port to create a combustion zone exterior of the burner tip.

There has thus been outlined, rather broadly, the more important features of the invention in order that the detailed description thereof that follows may be better understood and in order that the present contribution to the art may be better appreciated.

The invention may also include a plurality of burner tips assembled in a combustion can. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved non-premixed swirl burner tip that has all of the advantages of the prior art concentric or co-axial combustion nozzles and none of the disadvantages.

It is another object of the present invention to provide a new and improved non-premixed swirl burner tip that may be easily and efficiently manufactured and marketed.

An even further object of the present invention is to provide a new and improved non-premixed swirl burner tip that has a low cost of manufacture with regard to both materials and labor, and which accordingly is then susceptible of low prices of sale to the consuming public, thereby making such non-premixed swirl burner tip economically available to the buying public.

Still another object of the present invention is to provide a new non-premixed swirl burner tip that provides in the apparatuses and methods of the prior art some of the advantages thereof, while simultaneously overcoming some of the disadvantages normally associated therewith.

Even still another object of the present invention is to provide a non-premixed swirl burner tip for creating a combustion strategy for hydrogen-oxygen gases. This allows the non-premixing of reactive fluids until exiting the burner tip.

Lastly, it is an object of the present invention to provide a new and improved method of using a burner tip including the steps of introducing a first fluid into a first conduit including at least one first spiral vane extending from an interior surface thereof. Creating a first spiral flow of the first fluid in a first rotational direction by the first spiral vane. Introducing a second fluid into a second conduit located coaxial within the first conduit, with the second conduit including at least one second spiral vane extending from an interior surface of the second conduit. Creating a second spiral flow of the second fluid in a second rotational direction by the second spiral vane, with the second rotational direction being opposite the first rotational direction. Creating a combustion zone exterior of the first and second conduits where the first spiral flow and the second spiral flow mix.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures, with any phantom lines depicting fluid flow paths.

DETAILED DESCRIPTION OF THE INVENTION

Figure 1:
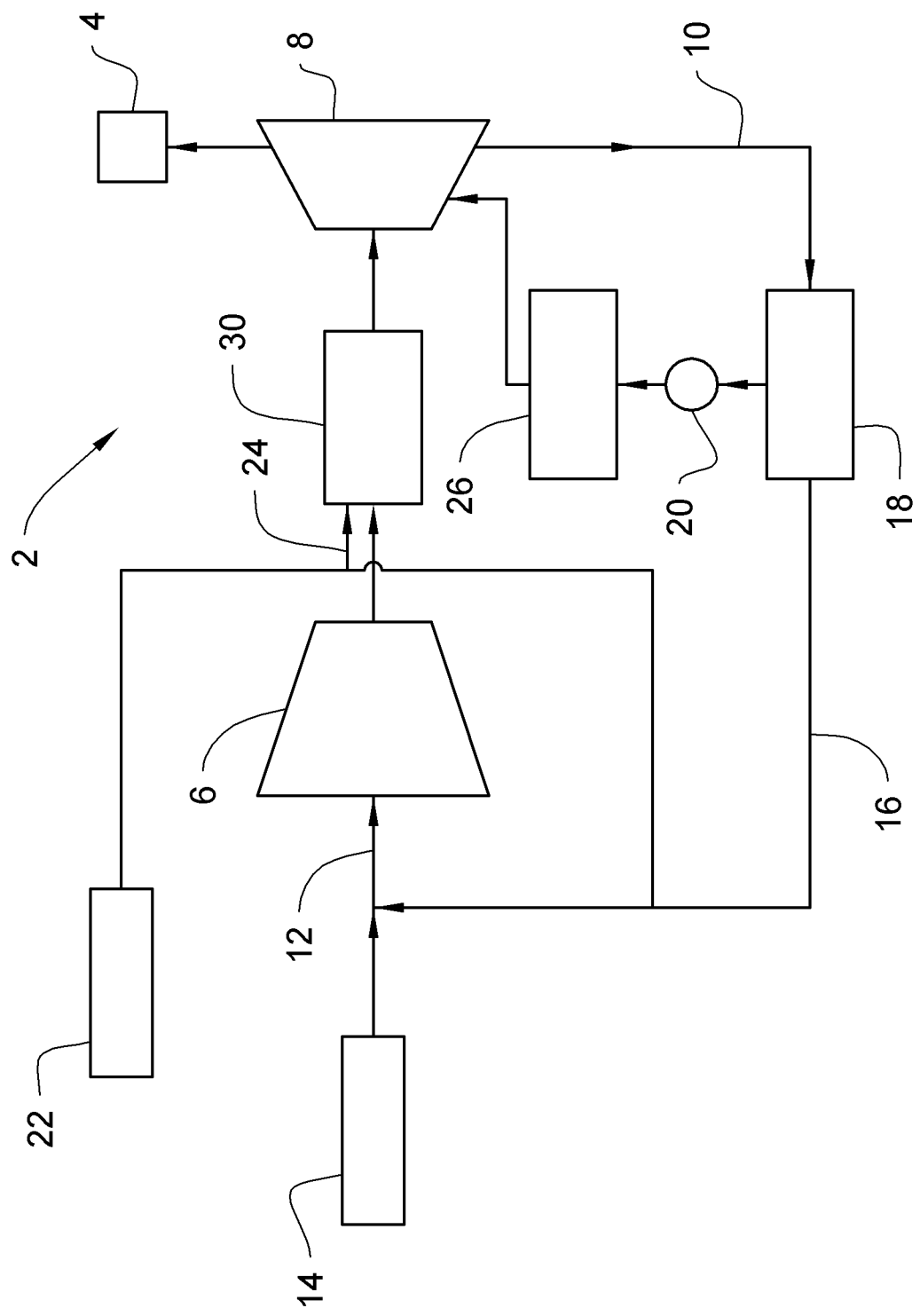
FIG. 1 is a simplified block diagram of a turbine system including the non-premixed swirl burner tip constructed in accordance with the principles of the present invention.

Referring now to the drawings, and particularly to FIGS. 1-5, an embodiment of the non-premixed swirl burner tip of the present invention is shown and generally designated by the reference numeral 2.

In FIG. 1 a turbine system 2 is illustrated and will be described that can include a new and improved non-premixed swirl burner tip 30 of the present invention. The swirl burner tip 30 is capable of creating a combustion strategy for hydrogen-oxygen gases. The combustion strategy is non-premixed combustion using dry steam mixed with the $O_2$ and/or $H_2$ to enable safe handling of $O_2$ and to provide an in situ mechanism for controlling the temperature of the post flame gases.

The turbine system 2 can comprise a first generator 4, a compressor 6, a swirl-stabilized chamber including the swirl burner tip 30, a turbine 8, and a steam turbine loop 10. In one embodiment, the compressor 6 receives a first working mixture 12, which can comprise of an oxidizer 14 such as $O_2$ and low temperature high quality dry steam 16. The oxidizer and dry steam are mixed prior to entering the compressor 6. The dry steam 16 is created by a heat exchanger/separator 18 associated with the steam turbine loop 10. Water from the heat exchanger/separator 18 can be returned to an electrolyzer, while hot water can be pumped 20 into the turbine 8 for thermal boundary layer temperature control water injection using a water injection system 26. The steam can be kept at temperatures above where condensation could happen. This could be accomplished by injecting small amounts of hydrogen through a catyalitic burner that will increase the gas temperature and add a controlled amount of dry steam to the first fluid.

The first reactant mixture ($O_2$+$H_2O$(g)) 12 exiting the compressor 6 is of high pressure and enters the swirl burner tip 30. A second reactant 22 such as $H_2$ enters the swirl burner tip 30 by way of a line separate from the first reactant mixture 12. The second reactant 22 can be further mixed with additional dry steam 16 to create a second reactant mixture 24 prior to entering the swirl burner tip 30 or within the swirl burner tip 30. The swirl burner tip 30 creates a high pressure, temperature combustion product (working fluid) introduced into the turbine 8.

It is known that pure $O_2$ is very reactive and for safety reasons needs to be diluted with an inert to create reactive properties similar to air. The above combination of the oxidizer 14 with dry steam 16 accomplishes this, for example at range of 20% $O_2$ and 80% dry steam ($H_2O$ (g)).

Figure 2:
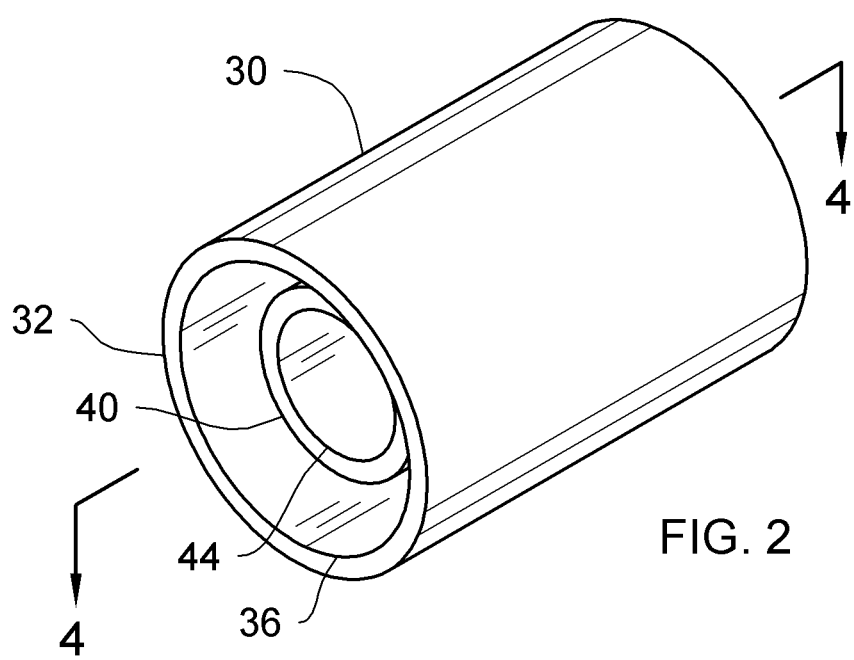
FIG. 2 is a side plane view of the non-premixed swirl burner tip of the present invention.
Figure 3:
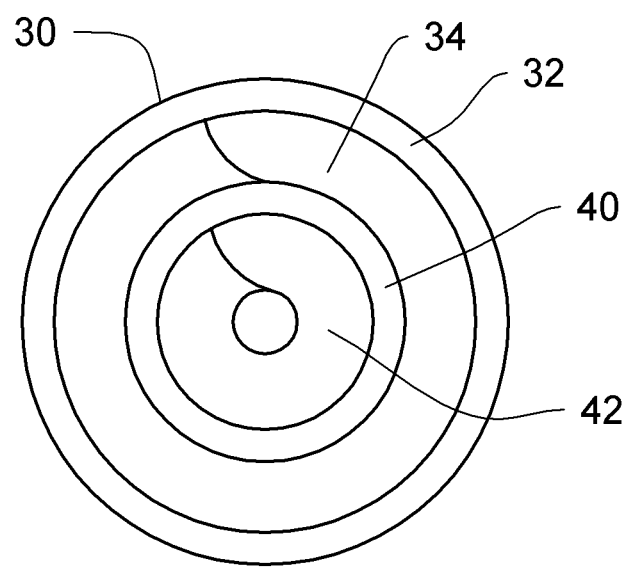
FIG. 3 is a front plane view of the non-premixed swirl burner tip of the present invention.
Figure 4:
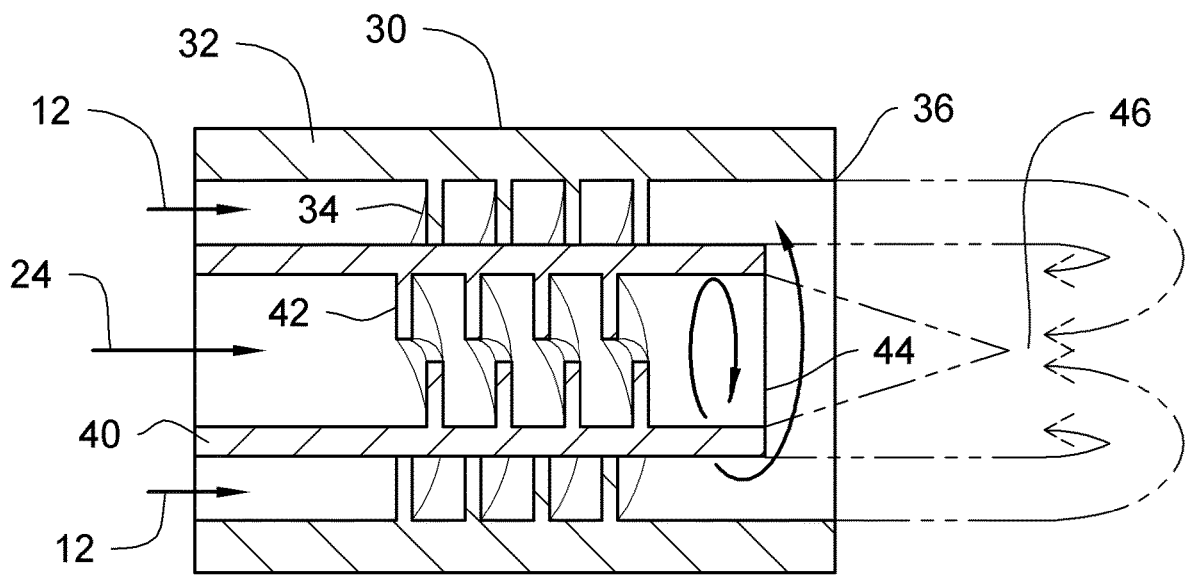
FIG. 4 is a cross-sectional view of the non-premixed swirl burner tip of the present invention taken along line 4-4 in FIG. 2.

FIGS. 2-4 best illustrates the swirl burner tip 30, which includes a first reactant mixture line or conduit 32 in a coaxial or concentric relationship with a second reactant mixture line or conduit 40. The first conduit 32 is configured to receive the first reactant mixture 12, and the second conduit 40 is located inside and coaxial with the first conduit 32 and is configured to receive the second reactant mixture 24. The first and second mixtures 12, 24 enter the swirl burner tip 30 separately in a non-premixed configuration. The first conduit 32 includes at least one interior first spiral vane 34, and an exit port 36. The first spiral vane 34 creates a swirling flow of the first reactant mixture 12 in a first rotational direction being clockwise or counter clockwise.

The second conduit 40 includes at least one interior second spiral vane 42, and an exit port 44 located with the interior of the first conduit 32. The second spiral vane 42 creates a swirling flow of the second reactant mixture 24 in a second rotational direction opposite the first direction of the first reactant mixture 12.

It can be appreciated that the exit port 36 of the first conduit 32 may or may not extend longitudinally past the exit port 44 of the second conduit 40. The first spiral vane 34 of the first conduit 32 can extend to and contact an exterior surface of the second conduit 40, to provide structure support to the second conduit 40 located therein. The swirl component of the second reactant mixture 24 may be weaker or stronger than the swirling flow of the first reactant mixture 12.

The coaxial configuration of the swirl burner tip 30 will create a first swirling flow pattern of the first reactant mixture 12 ($O_2$+$H_2O$(g)) outwardly from the exit port 36 of the first conduit 32 creating a secondary flow pattern back down a center axis onto the second conduit 40 to mix with a second swirling flow pattern of the second reactant mixture 24 exiting the second conduit 40, consequently creating a combustion zone 46. Mixing and premixed/partially premixed combustion occurs in the combustion zone 46, which is an aggressive controlled mixing zone.

Additional dry steam ($H_2O$(g)) can be added to the reactants to control the temperature in the post-flame gases from the swirl burner tip 30 to any desired level. The additional $H_2O$(g) will depend on the temperature limits of the turbine 8. This configuration will eliminate the need for a post-flame downstream injection system to control the temperature since this will be accomplished in the combustion zone 46. It can be appreciated that water dilution can be used for safety of reactant 12, 24 handling and control of combustion, and temperature control of the post-flame gases by thermal diluent.

The combustion strategy of the swirl burner tip 30 is one of stoichiometric $2H_2+O_2 \rightarrow 2H_2O(g)$ with added high quality dry steam (quality=1; $H_2O$ (g)) as in with the reactant stream a thermal diluent. The amount of $H_2O$(g) can be determined by the safety requirements of the reactants and the desired temperature of the post-flame gases. It can be appreciated that the design of the non-premixed swirl burner tip 30 is for safe handling of the reactants 12, 24. A further design of the swirl burner tip 30 is for rapid and thorough mixing of the reactants 12, 24 so combustion occurs in a nearly premixed configuration exterior of the swirl burner tip 30. The $H_2/O_2$ ratio is fixed to consume all $H_2$ and $O_2$ (stoichiometric), with dry steam ($H_2O$ (g)) strategically added to the reactants 12, 24.

Figure 5:
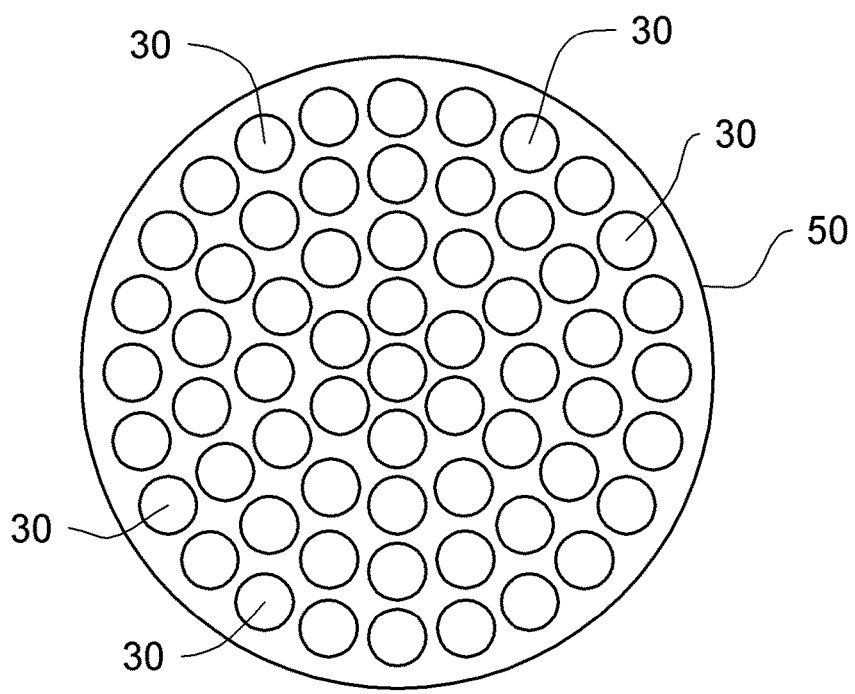
FIG. 5 is a front plane view of the combustion can of the present invention.

Multiple swirl burner tips 30 can be assembled in an array to create combustion can 50, as best illustrated in FIG. 5. A diameter or dimensional area of the combustion can 50 will depend on the geometry of a combustion section of the turbine 8. Several combustion cans 50 can be assemble in the combustion section of the turbine 8 and sized to meet a desired output power.

While embodiments of the non-premixed swirl burner tip have been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. And although creating a combustion strategy for hydrogen-oxygen gases have been described, it should be appreciated that the non-premixed swirl burner tip herein described is also suitable for creating coaxial counter rotating flows. It can be appreciated that $H_2+O_2$ catalytic burners strategically located along the $O_2+H_2O$(g) delivery system can be utilized to maintain $O_2+H_2O$ temperature to keep the $H_2O$ dry.

What is claimed is:

1. A method of using a burner tip comprising the steps of:
   a) introducing a first fluid into a first conduit including at least one first spiral vane extending from an interior surface of said first conduit, wherein said first fluid being a first reactant mixture of an oxidizer and dry steam, and said first conduit receives said first reactant mixture directly from a compressor;
   b) creating a first spiral flow of said first fluid in a first rotational direction by said first spiral vane;
   c) introducing a second fluid into a second conduit located coaxial within said first conduit, said second conduit including at least one second spiral vane extending from an interior surface of said second conduit, wherein said second fluid being a second reactant mixture including said dry steam;
   d) creating a second spiral flow of said second fluid in a second rotational direction by said second spiral vane, said second rotational direction being opposite said first rotational direction;
   e) exiting said first spiral flow from a first exit port of said first conduit in a first direction substantially parallel with a longitudinal axis of said first exit port, and then changing said first direction to a second direction substantially toward a second exit port of said second conduit; and
   d) creating a combustion zone exterior of said first and second conduits where said first spiral flow and said second spiral flow mix, where a combustion product exits said combustion zone and is introduced into a turbine;
   wherein said dry steam is created by a heat exchanger and separator associated with a steam turbine loop that receives a portion of said combustion product exiting said turbine, and water from said heat exchanger and separator is pumped into said turbine for thermal boundary layer temperature control water injection using a water injection system.

2. A combustion strategy method comprising:
   introducing a first reactant and a second reactant separately into a burner tip configured to create separate counter rotating flows of said first and second reactants to a mixing zone where combustion occurs;

exiting said first reactant from a first exit port of a first conduit of said burner tip in a first direction substantially parallel with a longitudinal axis of said first exit port, and then changing said first direction of said first reactant to a second direction substantially toward said second reactant exiting a second exit port of a second conduit of said burner tip;

adding a first portion of dry steam to said first reactant prior to entering a compressor for reactive control over said first reactant and for controlling a temperature of post flame gases; and adding a second portion of said dry steam to said second reactant prior to entering said burner tip;

introducing a combustion product from said burner tip to a turbine and providing a portion of said combustion product from said turbine to a steam turbine loop;

creating said dry steam from said combustion product utilizing a heat exchanger and separator associated with said steam turbine loop; and pumping water from said heat exchanger and separator to said turbine utilizing a water injection system.

3. The combustion strategy method as in claim 2, wherein said first reactant is oxygen, and said second reactant is hydrogen.

4. The combustion strategy method as in claim 3, wherein a ratio of said first and second reactants is fixed to consume all of said first and second reactants.

5. A combustion strategy system comprising:

a burner tip having a co-axial tube counter swirling burner configuration configured for non-premixed combustion using a first flow of a first reactant mixture including dry steam and $O_2$ mixed with a second flow of a second reactant mixture including dry steam and to provide an in situ mechanism for controlling temperature of post flame gases;

wherein said co-axial tube of said burner tip comprising:

a first conduit defining a hollow interior and a first exit port, said first conduit including at least one first spiral vane extending from an interior surface of said first conduit into said hollow interior, said first spiral vane being configured to create a first spiral flow of said first reactant mixture traveling through said first conduit, said first spiral flow being in a first rotational direction; and a second conduit located coaxially within said first conduit, said second conduit defining a hollow interior and a second exit port, said second conduit including at least one second spiral vane extending from an interior surface of said second conduit into said hollow interior of said second conduit, said second spiral vane being configured to create a second spiral flow of said second reactant mixture traveling through said second conduit, said second spiral flow being in a second rotational direction opposite said first spiral direction;

wherein said first conduit being configured to exit said first spiral flow in a first direction substantially parallel with a longitudinal axis of said first exit port, and then change said first direction of said first spiral flow to a second direction substantially toward said second spiral flow exiting said second exit port of said second conduit so as to mix said first and second spiral flows exterior of said burner tip in a combustion zone;

a compressor configured to directly provide said first reactant mixture to said first conduit;

a turbine configured to receive a combustion product from said combustion zone;

a steam turbine loop configured to provide a portion of said combustion product from said turbine to a heat exchanger and separator to create said dry steam of said first reactant mixture prior to entering said compressor and of said second reactant mixture prior to entering said second conduit; and a pump configured to pump water from said heat exchanger and separator to said turbine utilizing a water injection system.

6. The combustion strategy system as in claim 5, wherein said first spiral vane extends toward and contacts an exterior surface of said second conduit.

7. The combustion strategy system as in claim 5, wherein said second exit port is located within said hollow interior of said first conduit.

8. The combustion strategy system as in claim 5 further comprising a generator configured to receive a second portion of said combustion product from said turbine.

9. The combustion strategy system as in claim 5, wherein said burner tip is associated with at least a portion of a turbine combustion can.

10. The combustion strategy system as in claim 5, wherein said burner tip is a plurality of burner tips assembled in a combustor can.

* * * * *